United States Patent
Cobb, Jr. et al.

[11] Patent Number: 6,018,419
[45] Date of Patent: *Jan. 25, 2000

[54] DIFFUSE REFLECTORS

[75] Inventors: Sanford Cobb, Jr., St. Mary's Point; Brian D. Cull, Maplewood; Andrew J. Ouderkirk, Woodbury; Michael F. Weber, Shoreview; David L. Wortman, St. Paul, all of Minn.

[73] Assignee: 3M Intellectual Properties Company, St. Paul, Minn.

[*] Notice: This patent is subject to a terminal disclaimer.

[21] Appl. No.: 09/040,039

[22] Filed: Mar. 17, 1998

Related U.S. Application Data

[63] Continuation of application No. 08/927,436, Sep. 10, 1997, Pat. No. 5,825,542, which is a continuation of application No. 08/494,980, Jun. 26, 1995, abandoned.

[51] Int. Cl.[7] .......................................... G02B 5/30
[52] U.S. Cl. .......................... 359/500; 359/485; 359/495; 359/498; 359/599
[58] Field of Search .................... 359/485, 487, 359/488, 495, 498, 500, 599; 156/99

[56] References Cited

U.S. PATENT DOCUMENTS

| | | | |
|---|---|---|---|
| Re. 34,605 | 5/1994 | Schrenk et al. | 359/359 |
| 1,610,423 | 12/1926 | Cawley | 353/20 |
| 2,492,809 | 12/1949 | Marks | 88/65 |
| 2,887,566 | 5/1959 | Marks | 240/9.5 |
| 3,124,639 | 3/1964 | Kahn | 88/65 |

(List continued on next page.)

FOREIGN PATENT DOCUMENTS

| | | |
|---|---|---|
| 578035 | 6/1959 | Canada . |
| 724101 | 12/1965 | Canada . |
| 1200357 | 2/1986 | Canada . |
| 1327286 | 3/1994 | Canada . |
| 218041 | 12/1993 | China . |
| 81108331 | 1/1981 | European Pat. Off. . |
| 062751 | 10/1981 | European Pat. Off. . |
| 056843 | 8/1982 | European Pat. Off. . |
| 138194 | 4/1985 | European Pat. Off. . |
| 269324 | 6/1986 | European Pat. Off. . |
| 228611 | 7/1987 | European Pat. Off. . |
| 342283 | 11/1989 | European Pat. Off. . |
| 342747 | 11/1989 | European Pat. Off. . |
| 460241 | 12/1990 | European Pat. Off. . |
| 426636 | 5/1991 | European Pat. Off. . |
| 488544 | 11/1991 | European Pat. Off. . |

(List continued on next page.)

OTHER PUBLICATIONS

Schrenk et al., Nanolayer polymeric optical films, Tappi Journal, pp. 169–174, Jun., 1992.
3M Light Diffusing Film, Ad, Optical Systems, 3M (1993).
Light Diffuser with Controlled Divergence, IBM Technical Disclosure Bulletin, vol. 29, No. 1, p. 276–279 (Jun., 1986).
Alfrey, Jr. et al., Physical Optics of Iridescent Multilayered Plastic Films, Polymer Engineering and Science,, vol. 9, No. 6, p. 400–404 (Nov. 1969).
Hodgkinson, I. Et al., Effective Principal Refractive Indices and Column Angles for Periodic Stacks of Thin Birefringent Films, J. Opt. Soc. Am. A, vol. 10, No. 9, p. 2065–71 (1993).
Im, J. et al., Coextruded Microlayer Film and Sheet, Journal of Plastic Film and Sheeting, vol. 4, p. 104–15 (Apr., 1988).

(List continued on next page.)

*Primary Examiner*—Cassandra Spyrou
*Assistant Examiner*—Darren E. Schuberg
*Attorney, Agent, or Firm*—William D. Miller

[57] ABSTRACT

Highly efficient diffusely reflecting multilayer mirrors diffusely reflect light incident upon them. Highly efficient diffusely reflecting multilayer polarizers diffusely reflect light of one polarization while diffusely transmitting the other polarization. The diffusely reflecting mirror includes a light diffusing element and a multilayer mirror element. The diffusely reflecting polarizer includes a light diffusing element and a multilayer reflective polarizing element.

22 Claims, 9 Drawing Sheets

U.S. PATENT DOCUMENTS

| | | | |
|---|---|---|---|
| 3,213,753 | 10/1965 | Rogers | 88/65 |
| 3,528,723 | 9/1970 | Rogers | 350/157 |
| 3,610,729 | 10/1971 | Rogers | 350/157 |
| 3,647,612 | 3/1972 | Schrenk et al. | 161/165 |
| 3,711,176 | 1/1973 | Alfrey, Jr. et al. | 350/1 |
| 3,759,647 | 9/1973 | Schrenk et al. | 425/131 |
| 3,773,882 | 11/1973 | Schrenk et al. | 264/171 |
| 3,801,429 | 4/1974 | Schrenk et al. | 161/181 |
| 3,860,036 | 1/1975 | Newman, Jr. | 138/45 |
| 4,025,688 | 5/1977 | Nagy et al. | 428/350 |
| 4,094,947 | 6/1978 | Alfrey, Jr. et al. | 264/171 |
| 4,268,127 | 5/1981 | Oshima et al. | 350/337 |
| 4,310,584 | 1/1982 | Cooper et al. | 428/212 |
| 4,315,258 | 2/1982 | McKnight et al. | 340/784 |
| 4,427,741 | 1/1984 | Aizawa et al. | 428/332 |
| 4,446,305 | 5/1984 | Rogers et al. | 528/348 |
| 4,456,336 | 6/1984 | Chung et al. | 350/338 |
| 4,520,189 | 5/1985 | Rogers et al. | 528/331 |
| 4,521,588 | 6/1985 | Rogers et al. | 528/363 |
| 4,525,413 | 6/1985 | Rogers et al. | 428/212 |
| 4,540,623 | 9/1985 | Im et al. | 428/220 |
| 4,648,690 | 3/1987 | Ohe | 359/599 |
| 4,678,285 | 7/1987 | Ohta et al. | 350/345 |
| 4,720,426 | 1/1988 | Englert et al. | 428/344 |
| 4,798,448 | 1/1989 | van Raalte | 350/345 |
| 4,917,465 | 4/1990 | Conner et al. | 350/335 |
| 4,937,134 | 6/1990 | Schrenk et al. | 428/213 |
| 5,089,318 | 2/1992 | Shetty et al. | 428/212 |
| 5,094,788 | 3/1992 | Schrenk et al. | 264/171 |
| 5,094,793 | 3/1992 | Schrenk et al. | 264/171 |
| 5,095,210 | 3/1992 | Wheatley et al. | 250/339 |
| 5,103,337 | 4/1992 | Schrenk et al. | 359/359 |
| 5,122,905 | 6/1992 | Wheatley et al. | 359/586 |
| 5,122,906 | 6/1992 | Wheatley | 359/586 |
| 5,126,880 | 6/1992 | Wheatley et al. | 359/587 |
| 5,149,578 | 9/1992 | Wheatley et al. | 428/213 |
| 5,157,526 | 10/1992 | Kondo et al. | 359/63 |
| 5,159,478 | 10/1992 | Akiyama et al. | 359/69 |
| 5,170,287 | 12/1992 | Ludwig, Jr. et al. | 359/452 |
| 5,188,760 | 2/1993 | Hikmet et al. | 252/299.01 |
| 5,202,074 | 4/1993 | Schrenk et al. | 264/241 |
| 5,211,878 | 5/1993 | Reiffenrath et al. | 252/299.63 |
| 5,217,794 | 6/1993 | Schrenk | 428/220 |
| 5,233,465 | 8/1993 | Wheatley et al. | 359/359 |
| 5,234,729 | 8/1993 | Wheatley et al. | 428/30 |
| 5,235,443 | 8/1993 | Barnik et al. | 359/37 |
| 5,237,004 | 8/1993 | Wu et al. | 525/85 |
| 5,237,641 | 8/1993 | Jacobson et al. | 385/146 |
| 5,255,029 | 10/1993 | Vogeley et al. | 353/122 |
| 5,269,995 | 12/1993 | Ramanathan et al. | 264/171 |
| 5,278,694 | 1/1994 | Wheatley et al. | 359/359 |
| 5,294,657 | 3/1994 | Melendy et al. | 524/270 |
| 5,307,205 | 4/1994 | Ludwig, Jr. et al. | 359/453 |
| 5,316,703 | 5/1994 | Schrenk | 264/1.3 |
| 5,319,478 | 6/1994 | Fijnfschilling et al. | 359/53 |
| 5,325,218 | 6/1994 | Willett et al. | 359/53 |
| 5,333,072 | 7/1994 | Willett | 359/41 |
| 5,339,198 | 8/1994 | Wheatly et al. | 359/359 |
| 5,346,954 | 9/1994 | Wu et al. | 525/85 |
| 5,360,659 | 11/1994 | Arends et al. | 428/216 |
| 5,389,324 | 2/1995 | Lewis et al. | 264/171 |
| 5,424,119 | 6/1995 | Phillips et al. | 428/328 |
| 5,448,404 | 9/1995 | Schrenk et al. | 359/584 |
| 5,451,449 | 9/1995 | Shetty et al. | 428/195 |
| 5,481,445 | 1/1996 | Sitzema et al. | 362/308 |
| 5,486,935 | 1/1996 | Kalmanash | 359/37 |
| 5,486,949 | 1/1996 | Schrenk et al. | 359/498 |
| 5,540,978 | 7/1996 | Schrenk | 428/212 |
| 5,552,927 | 9/1996 | Wheatly et al. | 359/359 |
| 5,559,634 | 9/1996 | Weber | 359/638 |
| 5,568,316 | 10/1996 | Schrenk et al. | 359/584 |
| 5,612,820 | 3/1997 | Schrenk et al. | 359/498 |
| 5,629,055 | 5/1997 | Revol et al. | 428/1 |
| 5,686,979 | 11/1997 | Weber et al. | 349/96 |
| 5,699,188 | 12/1997 | Gilbert et al. | 359/584 |
| 5,721,603 | 2/1998 | De Vaan et al. | 349/194 |
| 5,744,534 | 4/1998 | Ishiharada et al. | 524/442 |
| 5,751,388 | 5/1998 | Larson | 349/96 |
| 5,767,935 | 6/1998 | Ueda et al. | 349/112 |
| 5,770,306 | 6/1998 | Suzuki et al. | 428/328 |
| 5,783,120 | 7/1998 | Ouderkirk et al. | 264/134 |
| 5,793,456 | 8/1998 | Broer et al. | 349/98 |
| 5,808,794 | 9/1998 | Weber et al. | 359/487 |
| 5,825,542 | 10/1998 | Cobb, Jr. et al. | 359/487 |
| 5,825,543 | 10/1998 | Ouderkirk et al. | 359/494 |

FOREIGN PATENT DOCUMENTS

| | | |
|---|---|---|
| 492636 | 12/1991 | European Pat. Off. . |
| 469732 | 2/1992 | European Pat. Off. . |
| 497506 | 8/1992 | European Pat. Off. . |
| 514223 | 11/1992 | European Pat. Off. . |
| 552725 | 7/1993 | European Pat. Off. . |
| 573905 | 12/1993 | European Pat. Off. . |
| 597261 | 5/1994 | European Pat. Off. . |
| 606939 | 7/1994 | European Pat. Off. . |
| 606940 | 7/1994 | European Pat. Off. . |
| 627638 | 12/1994 | European Pat. Off. . |
| 1363539 | 6/1963 | France . |
| 2646183 | 4/1989 | France . |
| 4121861 | 1/1992 | Germany . |
| 2-059702 | of 0000 | Japan . |
| 63-017023 | of 0000 | Japan . |
| 50-123446 | 3/1974 | Japan . |
| 52-21261 | 9/1978 | Japan . |
| 57-207204 | 12/1982 | Japan . |
| 61-241712 | 10/1986 | Japan . |
| 61-245104 | 10/1986 | Japan . |
| 63-289070 | 5/1987 | Japan . |
| 62-295024 | 12/1987 | Japan . |
| 63-55503 | 3/1988 | Japan . |
| 63-75704 | 4/1988 | Japan . |
| 63-168604 | 7/1988 | Japan . |
| 63-168626 | 7/1988 | Japan . |
| 63-180905 | 7/1988 | Japan . |
| 63-181201 | 7/1988 | Japan . |
| 63-208001 | 8/1988 | Japan . |
| 64-11203 | 1/1989 | Japan . |
| 3-111819 | 5/1991 | Japan . |
| 4-141603 | 5/1992 | Japan . |
| 4-184429 | 7/1992 | Japan . |
| 4-356038 | 12/1992 | Japan . |
| 5-288910 | 11/1993 | Japan . |
| 6-11607 | 1/1994 | Japan . |
| 6-222207 | 8/1994 | Japan . |
| 7-6043 | 1/1995 | Japan . |
| 7-64085 | 3/1995 | Japan . |
| 7-198915 | 8/1995 | Japan . |
| 7-333440 | 12/1995 | Japan . |
| 162481 | 2/1970 | Netherlands . |
| 1015706 | 1/1966 | United Kingdom . |
| 1125709 | 8/1968 | United Kingdom . |
| 2052779 | 1/1981 | United Kingdom . |
| 2124403 | 2/1984 | United Kingdom . |
| 2232498 | 5/1989 | United Kingdom . |
| WO 91/09719 | 7/1991 | WIPO . |
| WO 92/12857 | 8/1992 | WIPO . |
| WO 92/22838 | 12/1992 | WIPO . |
| WO 93/16878 | 9/1993 | WIPO . |
| WO 94/11776 | 5/1994 | WIPO . |
| WO 94/13478 | 6/1994 | WIPO . |
| WO 94/23933 | 10/1994 | WIPO . |
| WO 94/26512 | 11/1994 | WIPO . |

| | | |
|---|---|---|
| WO 94/29765 | 12/1994 | WIPO . |
| WO 95/27919 | 4/1995 | WIPO . |
| WO 95/33223 | 5/1995 | WIPO . |
| WO 95/17303 | 6/1995 | WIPO . |
| WO 95/17691 | 6/1995 | WIPO . |
| WO 95/17692 | 6/1995 | WIPO . |
| WO 95/17699 | 6/1995 | WIPO . |
| WO 96/19347 | 12/1995 | WIPO . |
| WO 97/01440 | 1/1997 | WIPO . |
| WO 97/01774 | 1/1997 | WIPO . |
| WO 97/32226 | 9/1997 | WIPO . |

OTHER PUBLICATIONS

Radford et al., Reflectivity of Iridescent Coextruded Multilayered Plastic Films, Polymer Engineering and Science, vol. 13, No. 3, (May 1973); Dow Chemical Co., American Chemical Society Symposium on "Coestruded Plastic Films, Fibers, Composites", Apr. 9–14, 1972.

Schrenk et al., Interfacial Flow Instability in Multilayer Coextrusion, Polymer Engineering and Science, vol. 18(8), p. 620–3 (Jun. 1978).

Schrenk et al., Coextruded Multilayer Polymer Films and Sheet, Chapt. 15, Polymer Blends, vol. 2, 129, Academic Press, Inc. (1978).

Schrenk, et al., "Coextruded Elastomeric Optical Interference Film", SPE Annual Technical Conference, Atlanta, GA p. 1703–7 (1988).

Schrenk, W., New Developments in Coextrusion, International Conference on Advances In Polymer Processing, New Orleans, Louisiana, (Apr., 1991).

Schrenk, W. et al., Coextruded Iridescent Film, TAPPI Paper Synthetics Conference, Atlanta, Georgia, p. 141–5 (Sep. 27–29, 1976).

Schrenk, W. et al., Coextruded Infrared Reflecting Films, 7th Annual Meeting Polymer Processing Society, Hamilton, Ontario, Canada, p. 222–3 (Apr. 1991).

Weber, M., P–61: Retroreflecting Sheet Polarizer, SID 93 Digest, pp. 669–672 (1993).

Weber, M., 23:3: Retroflecting Sheet Polarizer, SID 92 Digest, p. 427–9 (1992).

Wu et al., High Transparent Sheet Polarizer Made with Birefringent Materials, Jpn. J. of App. Phys., vol. 34, p. L 997–9, part 2, No. 8A (Aug. 1995).

DIFFUSE REFLECTORS

This is a continuation of application Ser. No. 08/927,436, now U.S. Pat. No. 5,825,542, filed Sep. 10, 1997; which is a continuation of application No. 08/494,980, filed Jun. 26, 1995, abandoned.

BACKGROUND

The physical downsizing of microprocessor based technologies has led to portable personal computers, pocket secretaries, wireless phones and pagers. All of these devices, and also other devices such as clocks, watches, calculators, etc., have the common need for a low power consumption data display screen to extend the useful working time between battery replacements or battery charges.

The common Liquid Crystal Display (LCD) is often used as the display for such devices. LCDs can be classified based upon tile source of illumination. Reflective displays are illuminated by ambient light that enters the display from the front. In applications where the intensity of ambient light is insufficient for viewing, supplemental lighting, such as a backlight assembly, is used to illuminate the display. Some electronic displays have been designed to use ambient light when available and backlighting only when necessary. This dual function of reflection and transmission leads to the designation, "transflective".

A limiting feature of all three types of the above described conventional LC displays are the dichroic polarizers conventionally used on both the front side and the rear of the LCD) panel. These polarizers most commonly use a dichroic dyed, oriented polymer polarizer that strongly absorbs one polarization of light (>99%) and weakly absorbs the other polarization (5–20%). Liquid crystal displays use two sheets of this type of polarizer combined with a liquid crystal panel to selectively allow transmission of light. The absorption by the dichroic polarizers greatly reduces the brightness and contrast in both reflective and backlit displays.

Another drawback to convention LCDs is that the reflector placed behind the backlight assembly are typically only about 94–96% reflective. In other words, these reflectors absorb between 4–6% of tile light at each reflection. Given that light may experience several reflections before exiting the backlight cavity, this amount of absorbance leads to decreased display efficiency, brightness and contrast.

Thus, there is a need in the art for polarizers and reflectors which are more efficient, have higher reflectivity and better performance, and are thus able to contribute to enhanced display efficiency, brightness and contrast.

SUMMARY

Highly efficient diffusely reflecting multilayer mirrors diffusely reflect light incident upon them. Highly efficient diffusely reflecting multilayer polarizers diffusely reflects light of one polarization while diffusely transmitting the other polarization. The diffusely reflecting mirror includes a light diffusing element and a multilayer mirror element. The diffusely reflecting polarizer includes a light diffusing element and a multilayer reflective polarizing element. The diffusing element for the diffusely reflecting polarizer preferably has a relatively low percentage of depolarization and back scatter (back reflection).

BRIEF DESCRIPTION OF THE DRAWINGS

In the drawings, where like numerals refer to like elements throughout the several views.

DETAILED DESCRIPTION

This invention is related to highly efficient diffusely reflecting mirrors which diffusely reflect light incident upon them. This invention is also related to highly efficient diffusely reflecting polarizers that diffusely reflect light of a selected polarization, and diffusely transmit the orthogonal polarization. The diffusely reflecting polarizers and mirrors are useful, for example, in LCD's used in either a reflective or transflective mode, in front lit LC projection screens, and in backlit signage.

Figure 1A:
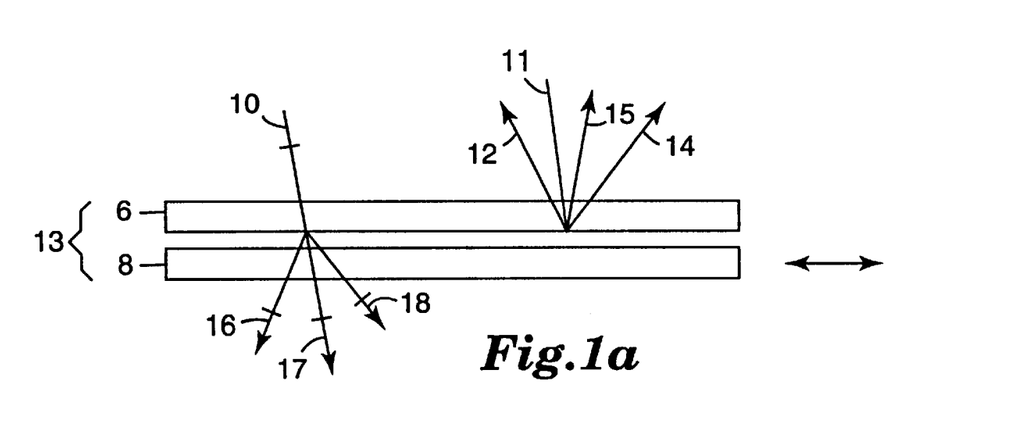
FIG. 1A shows a block diagram of the present diffusely reflecting mirror.

The basic construction of the diffusely reflecting polarizer is shown in FIG. 1A, and includes a reflective polarizing element 8 and a diffusing element 6. Light ray 10 is of the polarization transmitted by reflective polarizing element 8. Light ray 11 is of the polarization that is reflected by reflective polarizing element 8. Diffusing element 6 causes ray 11 to be diffusely reflected, forming rays 12, 14 and 15, for example.

The diffusing element 6 randomizes the direction of transmitted ray 10, resulting in transmitted rays 16, 17 and 18. This randomization of the direction of light of transmitted rays 16, 17 and 18 is useful in applications that require viewing light transmitted by a reflective polarizers over a range of angles. For example, the diffusely reflecting polarizer may be used as the transflector in a transflective LC display, or as the reflector in a reflective LCD.

Figure 1B:
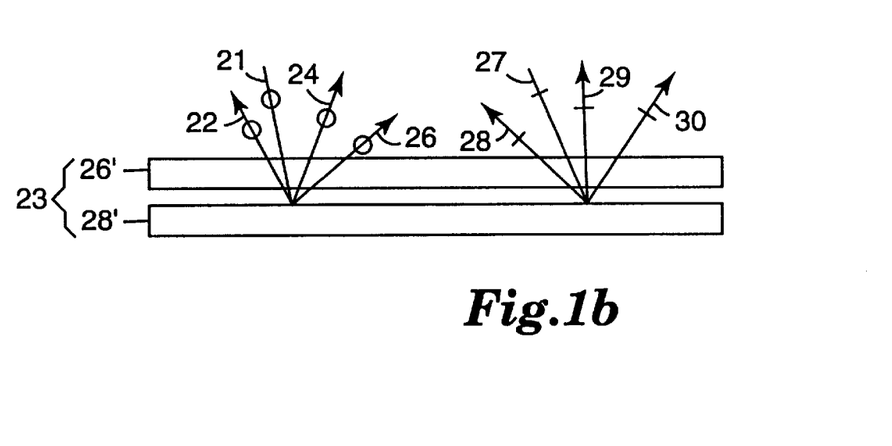
FIG. 1B shows a block diagram of the present diffusely reflecting polarizer.

FIG. 1B shows tile basic construction of a diffusely reflecting mirror 23. Diffusely reflecting mirror 23 includes a multilayer mirror element 28 and a diffusing element 26. Diffusely reflecting mirror 23 diffusely reflects rays of both polarizations 21 and 27 to create diffusely reflected rays 22, 24 and 26, and diffusely reflected rays 28, 29 and 30, respectively.

The diffusely reflecting mirror is useful in applications where diffuse reflectance is desirable, such as backlight reflectors in liquid crystal displays, and other display systems. For high efficiency applications, such as LCDs, the multilayer mirror desirably has a reflectance of 80%, more preferably 90%, more preferably 95%, and even more preferably 99% in both polarizations, for light incident at both normal and high angles.

The diffusing elements 6 (for the diffusely reflecting polarizer) and 26 (for the diffusely reflecting mirror) may be any structure or material capable of reducing the directionality of a beam of light reflecting off of the surface of the reflective polarizing element. Varying levels of diffusion can be used depending on the application, ranging from almost no diffusion (specular) to a very heavy amount of diffusion (lambertian). In general, this may be accomplished by structuring the reflective polarizer, adding a structured, refracting coating to the surface of the reflective polarizing element, or by adding a layer incorporating a light diffusing particulate material. The diffusing elements 6 and 26 should have low reflectivity, preferably less than 20%, more preferably less that 8%, and most preferably less than 4%. When used in display applications, the diffuser layer should also have a low degree of altering the state of polarization of light transmitted through the diffuser layer. In other words, the diffusing element is preferably polarization preserving to a large extent (as shown by ray 10 in FIG. 1). Preferably over 70% of the light will retain the initial state of polarization after transmission through the diffuser layer, more preferably over 85%, most preferably over 90%.

For reflective polarizers that have broad or localized changes in spectral reflectivity or transmission, the addition of a diffuser helps to make these variations more visually uniform.

For high efficiency backlights the diffuser and mirror combination may be either polarization preserving or polarization scrambling. For reflective, transflective and transmissive displays, it may be preferred that the diffuser is polarization preserving.

The diffusing elements 6 and 26 may be made of a transparent polymer matrix that incorporates transparent particles. The transparent particles should differ in refractive index from the matrix for at least one polarization transmitted or reflected by the reflective polarizing element. The diffusing layer is preferably made such that internal reflection and changes in the state of polarization is minimal. A birefringent or trirefringent thermoplastic matrix or light diffusing particles may be used as long as the fast axis of the matrix or particles is orthogonal to the first polarization of the reflective polarizing element.

Suitable thermoplastic matrix include polyethylene terephthalate, polyethylene isophthalate, 2,6-polyethylene naphthalate (its isomers), polyethylene butylate, copolymers of at least two of the proceeding polyesters, polyalkylacrylate, polymethylmethacrylate, polyethylene, polypropylene, polymethylpentene, cellulose acetate butylate, polycarbonate, bisphenol A polycarbonate, and Kraton (Shell). The matrix may also be made from adhesive materials including crosslinked acrylates, polyalphaolefins, and silicone.

In many applications, particularly display applications such as LCDs, it may be desirable to laminate or similarly adhere the diffusely reflecting polarizer or the diffusely reflecting mirror to other system components. In such a case, it may be desirably that the diffusing elements 6 or 26 are a diffusing adhesive which performs the dual function of diffusion and adhesion.

One exemplary diffusing adhesive can be made by forming acrylic/styrene beads and dispersing the beads in a water based emulsion adhesive. An adhesive containing 5% by weight of the microspheres, was coated out on a PET liner film and was dried to form an 8.4 grain/4"×6" adhesive layer. Diffusing adhesive was coated to 4 mils wet at 17 feet per minute. The drying oven was 30 feet in length. The drying temperature was 180° F.

Preparation of Styrene Particles:

3 grams of poly(vinyl alcohol) and 9 grams of standapol-A (ammonium lauryl sulfate—hercules) was dissolved in 480 grams of water. 2 grains of lucidol™-75 (75% beinzoyl peroxide—Elf Atochen) was dissolved in 120 g of styrene. The above two mixtures were blended and emulsified in a Gaulin homogenizer until the droplet size was approximately 2 microns. The emulsion was charged to a 1 liter reactor, heated to 80° C., degassed with argon and allowed to react for 12 hours.

Preparation of Pressure-Sensitve Adhesive Microparticles by Suspension Polymerization Method 1 gram of sodium dodecyl benzene sulfonate was dissolved in 360 grams of deionized water. 2.4 grams of poly(ethylene oxide) 16 acrylate (PEO), 4.8 grains of acrylic acid and 1.05 grams of Lucido™75 (75% benzoyl peroxide from Elf Atochem) were dissolved in 232.8 grams of iso-octyl acrylate (IOA). The above mixture was emulsified in a Gaulin homogenizer such that the droplet size was 1 micron or less. This emulsion was then charged to 1 liter reactor, stirred at 400 RPM and heated to 65° C. for 4 hours. The 97/2/1 IOA/AA/PEO resulting particles had a size of approximately 2 microns as viewed with an optical microscope and had an index of refraction of 1.47.

Light-Diffusing Adhesive Preparation 440 grams of the above Pressure Sensitive Adhesive Suspension was blended with 58 grams of the above poly (styrene) suspension, 1.5 grams of Triton GR-5M (Rohm & Haas) and 1.8 grams Polyphobe 104 (Union Carbide). The mixture was neutralized with ammonium hydroxide to a pH of 8.3. The diffuser adhesive solution was coated onto a PET release liner at 4 mils wet and dried at 65° C. for 10 minutes. The dried light-diffusing adhesive films was then transferred to the polarizing film.

Multilayer Optical Film

The diffusely reflective mirrors and polarizers described herein rely on the unique and advantageous properties of multilayer optical films. The advantages, characteristics and manufacturing of such films are most completely described in the above mentioned copending and commonly assigned U.S. patent application Ser. No. 08/402,041, filed Mar. 10, 1995, titled OPTICAL FILM, which is incorporated herein by reference. The multilayer optical film is useful, for example, as highly efficient mirrors and/or polarizers. A relatively brief description of the properties and characteristics of the multilayer optical film is presented below followed by a description of illustrative embodiments of backlight systems using the multilayer optical film according to the present invention.

Multilayer optical films as used in conjunction with the present invention exhibit relatively low absorption of incident light, as well as high reflectivity for off-axis as well as normal light rays. These properties generally hold whether the films are used for pure reflection or reflective polarization of light. The unique properties and advantages of the multi-layer optical film provides an opportunity to design highly efficient backlight systems which exhibit low absorption losses when compared to known backlight systems.

Figure 2A:
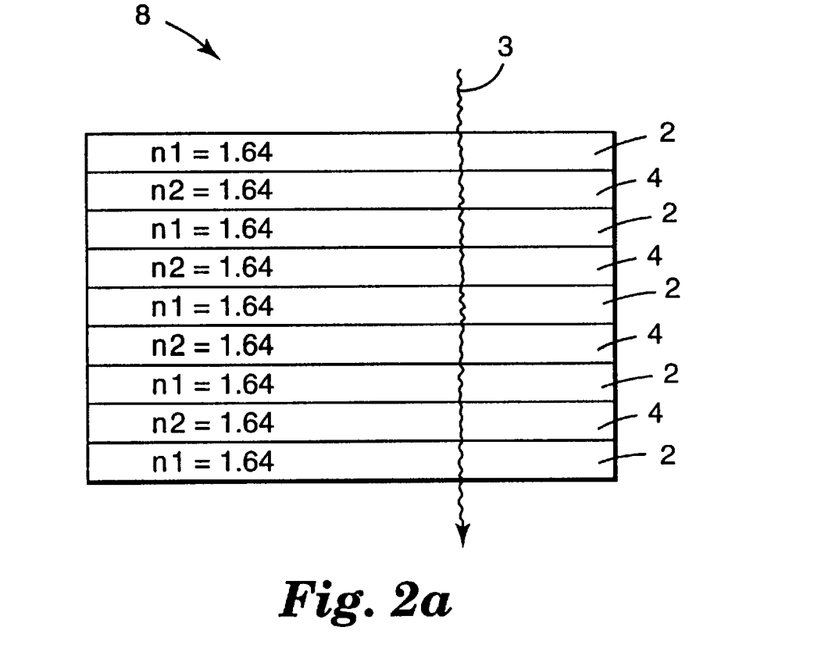
FIGS. 2A, 2B and 2C show the multilayer optical film which is used to make the preferred reflective polarizing element and reflective mirror element.
Figure 2B:
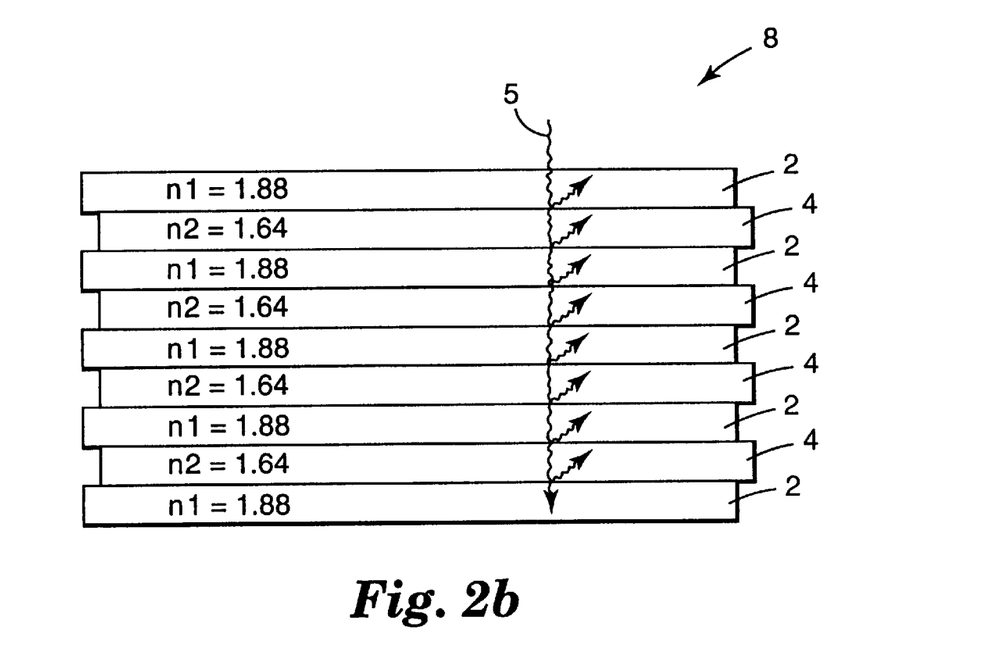

An exemplary multilayer optical film of the present invention as illustrated in FIGS. 2A and 2B includes a multilayer stack 10 having alternating layers of at least two materials 12 and 14. At least one of the materials has the property of stress induced birefringence, such that the index of refraction (n) of the material is affected by the stretching process. FIG. 2A shows an exemplary multilayer stack before the stretching process in which both materials have the same index of refraction. Light ray 13 experiences no index of refraction change and passes through the stack. In FIG. 2B the same stack has been stretched, thus increasing the index of refraction of material 12. The difference in refractive index at each boundary between layers will cause part of ray 15 to be reflected. By stretching the multilayer stack over a range of uniaxial to biaxial orientation, a film is created with a range of reflectivities for differently oriented plane-polarized incident light. The multilayer stack can thus be made useful as reflective polarizers or mirrors.

Multilayer optical films constructed according to the present invention exhibit a Brewster angle (the angle at which reflectance goes to zero for light incident at any of the layer interfaces) which is very large or is nonexistent. In contrast, known multilayer polymer films exhibit relatively small Brewster angles at layer interfaces, resulting in transmission of light and/or undesirable iridescence. The multilayer optical films according to the present invention, however, allow for the construction of mirrors and polarizers whose reflectivity for p polarized light decrease slowly with angle of incidence, are independent of angle of incidence, or increase with angle of incidence away from the normal. As a result, multilayer stacks having high reflectivity for both s and p polarized light over a wide bandwidth, and over a wide range of angles can be achieved.

Figure 2C:
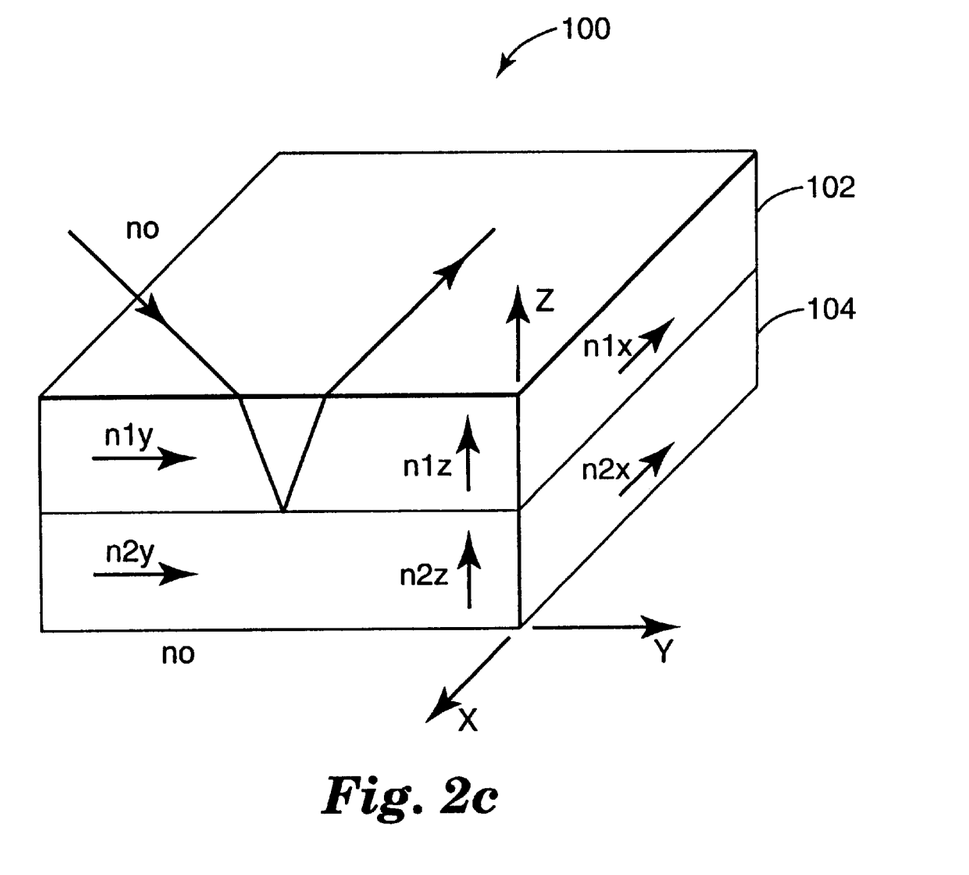

FIG. 2C shows two layers of a multilayer stack, and indicates the three dimensional indices of refraction for each layer. The indices of refraction for each layer are n1x, n1y, and n1z for layer 102, and n2x, n2y, and n2z for layer 104. The relationships between the indices of refraction in each film layer to each other and to those of the other layers in the film stack determine the reflectance behavior of the multilayer stack at any angle of incidence, from any azimuthal direction. The principles and design considerations described in U.S. patent application Ser. No. 08/402,041 can be applied to create multilayer stacks having the desired optical effects for a wide variety of circumstances and applications. The indices of refraction of the layers in the multilayer stack can be manipulated and tailored to produce the desired optical properties.

Referring again to FIG. 2B, the multilayer stack 10 can include tens, hundreds or thousands of layers, and each layer call be made from any of a number of different materials. The characteristics which determine the choice of materials for a particular stack depend upon the desired optical performance of the stack. The stack can contain as many materials as there arc layers in the stack. For ease of manufacture, preferred optical thin film stacks contain only a few different materials.

The boundaries between the materials, or chemically identical materials with different physical properties, can be abrupt or gradual. Except for some simple cases with analytical solutions, analysis of the latter type of stratified media with continuously varying index is usually treated as a much larger number of thinner uniform layers having abrupt boundaries but with only a small change in properties between adjacent layers.

The preferred multilayer stack is comprised of low/high index pairs of film layers, wherein each low/high index pair of layers has a combined optical thickness of ½ the center wavelength of the band it is designed to reflect. Stacks of such films are commonly referred to as quarterwave stacks. For multilayer optical films concerned with the visible and the near infrared wavelengths, a quarterwave stack design results in each of the layers in the multilayer stack having an average thickness of not more than 0.5 microns.

In those applications where reflective films (e.g. mirrors) are desired, the desired average transmission for light of each polarization and plane of incidence generally depends upon the intended use of the reflective film. One way to produce a multilayer mirror film is to biaxially stretch a multilayer stack which contains a birefringent material as the high index layer of the low/high index pair. For a high efficiency reflective film, average transmission along each stretch direction at normal incidence over the visible spectrum (400–700 nm) is desirably less than 10% (reflectance greater than 90%), preferably less than 5% (reflectance greater than 95%), more preferably less than 2% (reflectance greater than 98%), and even more preferably less than 1% (reflectance greater than 99%). The average transmission at 60 degrees from the normal from 400–700 nm is desirably less than 20% (reflectance greater than 80%), preferably less than 10% (reflectance greater than 90%), more preferably less than 5% (reflectance greater than 95%), and even more preferably less than 2% (reflectance greater than 98%), and even more preferably less than 1% (reflectance greater than 99%).

In addition, asymmetric reflective films may be desirable for certain applications. In that case, average transmission along one stretch direction may be desirably less than, for example, 50%, while the average transmission along the other stretch direction may be desirably less than, for example 20%, over a bandwidth of, for example, the visible spectrum (400–700 nm), or over the visible spectrum and into the near infrared (e.g., 400–850 nm).

Multilayer optical films can also be designed to operate as reflective polarizers. One way to produce a multilayer reflective polarizer is to uniaxially stretch a multilayer stack. The resulting reflective polarizers have high reflectivity for light with its plane of polarization parallel to one axis (in the stretch direction) for a broad range of angles of incidence, and simultaneously have low reflectivity and high transmissivity for light with its plane of polarization parallel to the other axis (in the non-stretch direction) for a broad range of angles of incidence. By controlling the three indices of refraction of each film, nx, ny and nz, the desired polarizer behavior can be obtained.

For many applications, the ideal reflecting polarizer has high reflectance along one axis (the so-called extinction axis) and zero reflectance along the other (the so-called transmission axis), at all angles of incidence. For the transmission axis of a polarizer, it generally desirable to maximize transmission of light polarized in the direction of the transmission axis over the bandwidth of interest and also over the range of angles of interest.

The average transmission at normal incidence for a polarizer in the transmission axis across the visible spectrum (400–700 nm for a bandwidth of 300 nm) is desirably at least 50%, preferably at least 70%, more preferably at least 85%, and even more preferably at least 90%. The average transmission at 60 degrees from the normal (measured along the transmission axis for p-polarized light) for a polarizer from 400–700 nm is desirably at least 50%, preferably at least 70%, more preferably at least 80%, and even more preferably at least 90%.

The average transmission for a multilayer reflective polarizer at normal incidence for light polarized in the direction of the extinction axis across the visible spectrum (400–700 nm for a bandwidth of 300 nm) is desirably at less than 50%, preferably less than 30%, more preferably less than 15%, and even more preferably less than 5%. The average transmission at 60 degrees from the normal (measured along the transmission axis for p-polarized light) for a polarizer for light polarized in the direction of the extinction axis from 400–700 nm is desirably less than 50%, preferably less than 30%, more preferably less than 15%, and even more preferably less than 5%.

For certain applications, high reflectivity for p-polarized light with its plane of polarization parallel to the transmission axis at off-normal angles are preferred. The average reflectivity for light polarized along the transmission axis should be more than 20% at an angle of at least 20 degrees from the normal.

In addition, although reflective polarizing films and asymmetric reflective films are discussed separately herein, it should be understood that two or more of such films could be provided to reflect substantially all light incident on them (provided they are properly oriented with respect to each other to do so). This construction is typically desired when the multilayer optical film is used as a reflector in a backlight system according to the present invention.

If some reflectivity occurs along the transmission axis, the efficiency of the polarizer at off-normal angles may be reduced. If the reflectivity along the transmission axis is different for various wavelengths, color may be introduced into the transmitted light. One way to measure the color is to determine the root mean square (RMS) value of the transmissivity at a selected angle or angles over the wavelength range of interest. Tile % RMS color, $C_{RAMS}$, can be determined according to the equation:

$$C_{\text{RMS}} = \frac{\int_{\lambda 1}^{\lambda 2} ((T - \overline{T})^2)^{1/2} d\lambda}{\overline{T}}$$

where the range $\lambda 1$ to $\lambda 2$ is the wavelength range, or bandwidth, of interest, T is the transmissivity along the transmission axis, and $\overline{T}$ is the average transmissivity along the transmission axis in the wavelength range of interest. For applications where a low color polarizer is desirable, the % RMS color should be less than 10%, preferably less than 8%, more preferably less than 3.5%, and even more preferably less than 2% at an angle of at least 30 degrees from the normal, preferably at least 45 degrees from the normal, and even more preferably at least 60 degrees from the normal.

Preferably, a reflective polarizer combines the desired % RMS color along the transmission axis for the particular application with the desired amount of reflectivity along the extinction axis across the bandwidth of interest. For polarizers having a bandwidth in the visible range (400–700 nm, or a bandwidth of 300 nm), average transmission along the extinction axis at normal incidence is desirably less than 40%, more desirably less than 25%, preferably less than 15%, more preferably less than 5% and even more preferably less than 3%.

Materials Selection and Processing

With the design considerations described in the above mentioned U.S. patent application Ser. No. 08/402,041, one of ordinary skill will readily appreciate that a wide variety of materials can be used to form multilayer reflective films or polarizers according to the invention when processed under conditions selected to yield the desired refractive index relationships. The desired refractive index relationships can be achieved in a variety of ways, including stretching during or after film formation (e.g., in the case of organic polymers), extruding (e.g., in the case of liquid crystalline materials), or coating. In addition, it is preferred that the two materials have similar rheological properties (e.g., melt viscosities) such that they can be co-extruded.

In general, appropriate combinations may be achieved by selecting, as the first material, a crystalline or semi-crystalline material, preferably a polymer. The second material, in turn, may be crystalline, semi-crystalline, or amorphous. The second material may have a birefringence opposite of the first material. Or, the second material may have no birefringence, of less birefringence than the first material.

Specific examples of suitable materials include polyethylene naphthalate (PEN) and isomers thereof (e.g., 2,6-, 1,4-, 1,5-, 2,7-, and 2,3-PEN), polyalkylene terephthalates (e.g., polyethylene terephthalate, polybutylene terephthalate, and poly-1,4-cyclohexanedimethlylene terephthalate), polyimides (e.g., polyacrylic imides), polyetherimides, atactic polystyrene, polycarbonates, polymethacrylates (e.g., polyisobutyl metliacrylate, polypropylmethacrylate, polyethylmethaciylate, and polymethylinethacrylate), polyacrylates (e.g., polybutylacrylate and polymethylacrylate), syndiotactic polystyrene (sPS), syndiotactic poly-alpha-methyl styrene, syndiotactic polydiclilorostyrene, copolymers and blends of any of these polystyrenes, cellulose derivatives (e.g., ethyl cellulose, cellulose acetate, cellulose propionate, cellulose acetate butyrate, and cellulose nitrate), polyalkylene polymers (e.g., polyethylene, polypropylene, polybutylene, polyisobutylene, and poly(4-methyl)pentene), fluorinated polymers (e.g., perfluoroalkoxy resins, polytetrafluoroethylene, fluorinated ethylene-propylene copolymers, polyvinylidene fluoride, and polychlorotrifluoroetliylene), chlorinated polymers (e.g., polyvinylidene chloride and polyvinylchloride), polysulfones, polyethersulfones, polyacrylonitrile, polyamides, silicone resins, epoxy resins, polyvinylacetate, polyether-amides, ionomeric resins, elastoiners (e.g., polybutadiene, polyisoprene, and neoprene), and polyurethanes. Also suitable are copolymers, e.g., copolymers of PEN (e.g., copolymers of 2,6-, 1,4-, 1,5-, 2,7-, and/or 2,3-naphthalene dicarboxylic acid, or esters thereof, with (a) terephthalic acid, or esters thereof, (b) isophthalic acid, or esters thereof, (c) phthalic acid, or esters thereof, (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), copolymers of polyalkylene terephthalates (e.g., copolymers of tereplithalic acid, or esters thereof, with (a) naphthalene dicarboxylic acid, or esters thereof; (b) isoplithalic acid, or esters thereof; (c) plitialic acid, or esters thereof; (d) alkane glycols; (e) cycloalkane glycols (e.g., cyclohexane dimethane diol); (f) alkane dicarboxylic acids; and/or (g) cycloalkane dicarboxylic acids (e.g., cyclohexane dicarboxylic acid)), and styrene copolymers (e.g., styrene-butadiene copolymers and styrene-acrylonitrile copolymers), 4,4'-bibenzoic acid and ethylene glycol. In addition, each individual layer may include blends of two or more of the above-described polymers or copolymers (e.g., blends of sPS and atactic polystyrene). The coPEN described may also be a blend of pellets where at least one component is a polymer based on naphthalene dicarboxylic acid and other components are other polyesters or polycarbonates, such as a PET, a PEN or a co-PEN.

Particularly preferred combinations of layers in the case of polarizers include PEN/co-PEN, polyethylene terephthalate (PET)/co-PEN, PEN/sPS, PET/sPS, PEN/Eastar, and PET/Eastar, where "co-PEN" refers to a copolymer or blend based upon naphthalene dicarboxylic acid (as described above) and Eastar is polycyclohexanedimethylene terephthalate commercially available from Eastman Chemical Co.

Particularly preferred combinations of layers in the case of reflective films include PET/Ecdel, PEN/Ecdel, PEN/sPS, PEN/THV, PEN/co-PET, and PET/sPS, where "co-PET" refers to a copolymer or blend based upon terephthalic acid (as described above), Ecdel is a thermoplastic polyester commercially available from Eastman Chemical Co., and THV is a fluoropolymer commercially available from Minnesota Mining and Manufacturing Company, St. Paul, Minn.

The number of layers in the film is selected to achieve the desired optical properties using the minimum number of layers for reasons of film thickness, flexibility and economy. In the case of both polarizers and reflective films, the number of layers is preferably less than 10,000, more preferably less than 5,000, and even more preferably less than 2,000.

As discussed above, the ability to achieve the desired relationships among the various indices of refraction (and thus the optical properties of the multilayer film) is influenced by the processing conditions used to prepare the multilayer film. In the case of organic polymers which can be oriented by stretching, the films are generally prepared by co-extruding the individual polymers to form a multilayer film and then orienting the film by stretching at a selected temperature, optionally followed by heat-setting at a selected temperature. Alternatively, the extrusion and orientation steps may be performed simultaneously. In the case of polarizers, the film is stretched substantially in one direction (uniaxial orientation), while in the case of reflective films the film is stretched substantially in two directions (biaxial orientation).

The film may be allowed to dimensionally relax in the cross-stretch direction from the natural reduction in cross-stretch (equal to the square root of the stretch ratio), it may simply be constrained to limit any substantial change in cross-stretch dimension; or it may be actively stretched in the cross-stretch dimension. Tile film may be stretched in the machine direction, as with a length orienter, or in width using a tenter.

The pre-stretch temperature, stretch temperature, stretch rate, stretch ratio, heat set temperature, heat set time, heat set relaxation, and cross-stretch relaxation are selected to yield a multilayer film having the desired refractive index relationship. These variables are inter-dependent; thus, for example, a relatively low stretch rate could be used if coupled with, e.g., a relatively low stretch temperature. It will be apparent to one of ordinary skill how to select the appropriate combination of these variables to achieve the desired multilayer film. In general, however, a stretch ratios in the range from 1:2 to 1:10 (more preferably 1:3 to 1:7) in the stretch direction and from 1:0.2 to 1:10 (more preferably from 1:0.3 to 1:7) orthogonal to the stretch direction is preferred.

Suitable multilayer films may also be prepared using techniques such as spin coating (e.g., as described in Boese et al., J. Polym. Sci.: Part B, 30:1321 (1992) for birefringent polyimides, and vacuum deposition (e.g., as described by Zang et. al., Appl. Phys. Letters, 59:823 (1991) for crystalline organic compounds; the latter technique is particularly useful for certain combinations of crystalline organic compounds and inorganic materials.

Exemplary multilayer reflective mirror films and multilayer reflective polarizers will now be described in the following examples.

EXAMPLE 1 (PEN:THV 500, 449, Mirror)

A coextruded film containing 449 layers was made by extruding the cast web in one operation and later orienting the film in a laboratory film-stretching apparatus. A Polyethylene naphthalate (PEN) with an Intrinsic Viscosity of 0.53 dl/g (60 wt. % phenol/40 wt. % dichlorobenzene) was delivered by one extruder at a rate of 56 pounds per hour and THV 500 (a fluoropolymer available from Minnesota Mining and Manufacturing Company) was delivered by another extruder at a rate of 11 pounds per hour. The PEN was on the skin layers and 50% of the PEN was present in the two skin layers. The feedblock method was used to generate 57 layers which was passed through three multipliers producing an extrudate of 449 layers. The cast web was 20 mils thick and 12 inches wide. The web was later biaxially oriented using a laboratory stretching device that uses a pantograph to grip a square section of film and simultaneously stretch it in both directions at a uniform rate. A 7.46 cm square of web was loaded into the stretcher at about 100° C. and heated to 140° C. in 60 seconds. Stretching then commenced at 10%/sec (based on original dimensions) until the sample was stretched to about 3.5×3.5. Immediately after the stretching the sample was cooled by blowing room temperature air at it.

Figure 3:
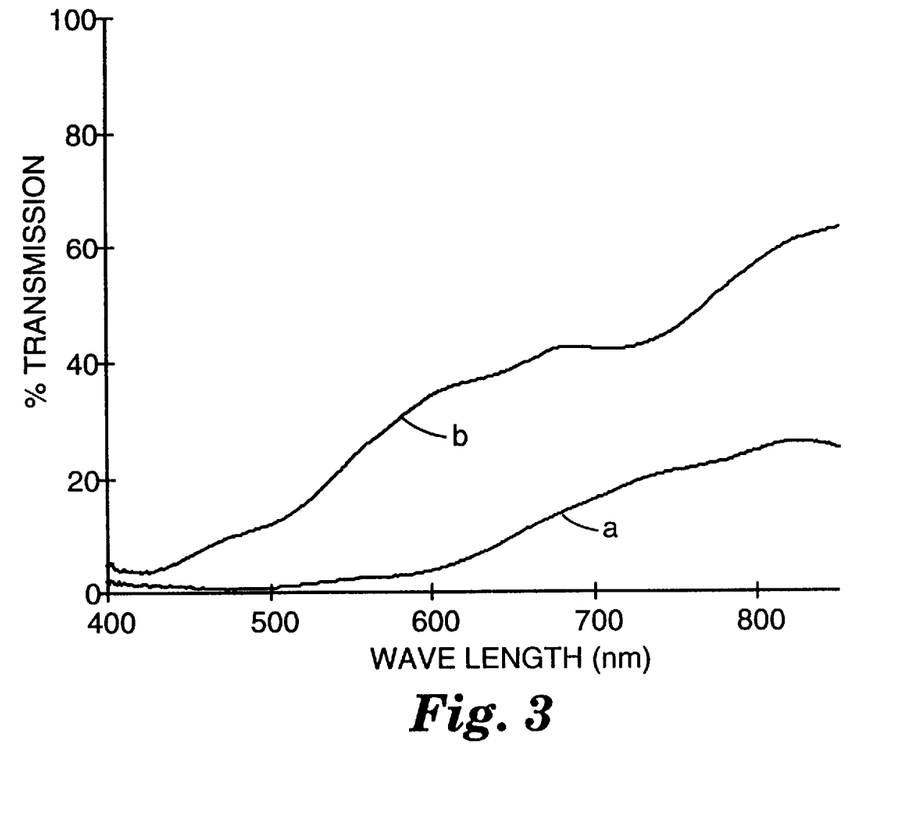
FIGS. 3–8 show transmission spectra of the multilayer optical films given in Examples 1–6.

FIG. 3 shows the transmission of this multilayer film. Curve (a) shows the response at normal incidence, while curve (b) shows the response at 60 degrees for p-polarized light.

EXAMPLE 2 (PEN:PMMA 601. Mirror)

A coextruded film containing 601 layers was made on a sequential flat-film-making line via a coextrusion process. Polyethylene Naphthalate (PEN) with an Intrinsic Viscosity of 0.57 d/g (60 wt. % phenol/40 wt. % dichlorobenzene) was delivered by extruder A at a rate of 114 pounds per hour with 64 pounds per hour going to the feedblock and the rest going to skin layers described below. PMMA (CP-82 from ICI of Americas) was delivered by extruder B at a rate of 61 pounds per hour with all of it going to tile feedblock. PEN was on the skin layers of the feedblock. The feedblock method was used to generate 151 layers using the feedblock such as those described in U.S. Pat. 3,801,429, after the feedblock two symmetric skin layers were coextruded using extruder C metering about 30 pounds per hour of the same type of PEN delivered by extruder A. This extrudate passed through two multipliers producing an extrudate of about 601 layers. U.S. Pat. 3,565,985 describes similar coextrusion multipliers. The extrudate passed through another device that coextruded skin layers at a total rate of 50 pounds per hour of PEN from extruder A. The web was length oriented to a draw ratio of about 3.2 with the web temperature at about 280° F. The film was subsequently preheated to about 310° F. in about 38 seconds and drawn in the transverse direction to a draw ratio of about 4.5 at a rate of about 11% per second. The film was then heat-set at 440° F. with no relaxation allowed. The finished film thickness was about 3 mil.

Figure 4:
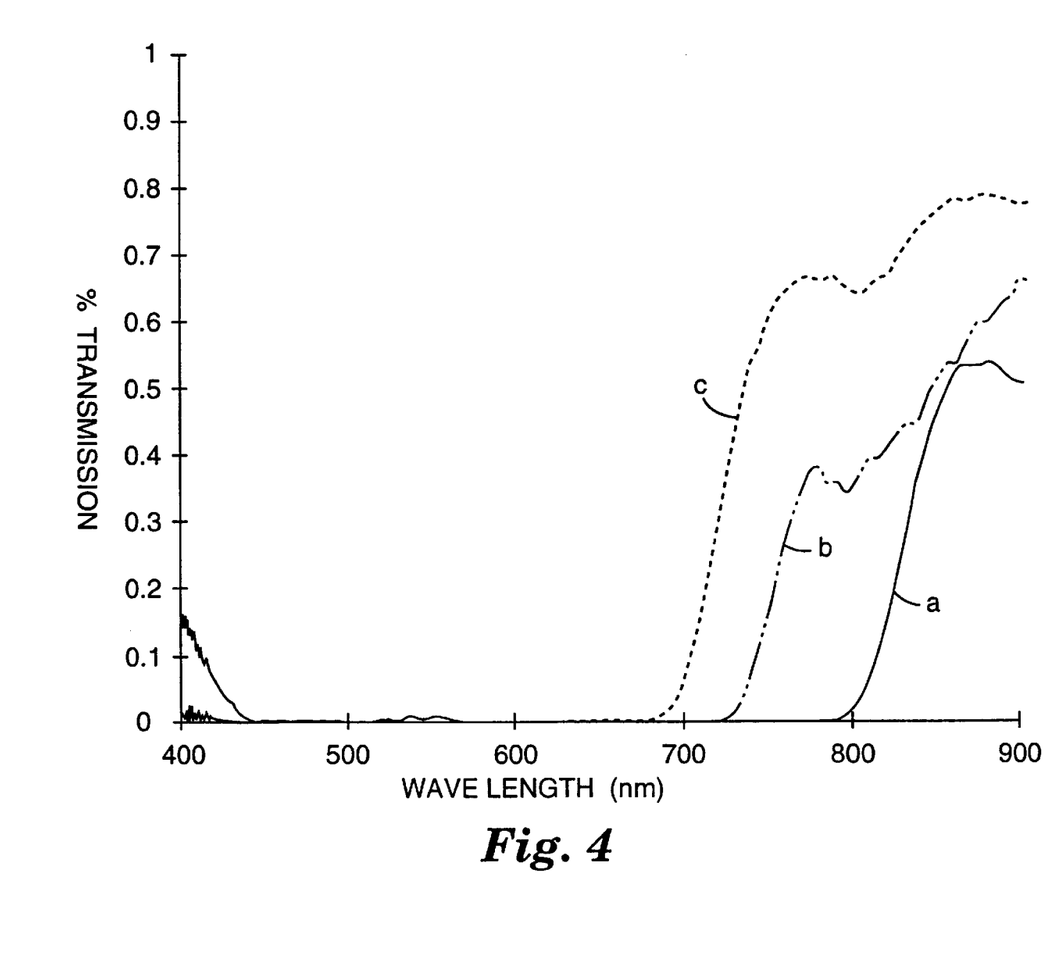

As seen in FIG. 4, curve (a), the bandwidth at normal incidence is about 350 nm with an average in-band extinction of greater than 99%. The amount of optical absorption is difficult to measure because of its low value, but is less than 1%. At an incidence angle of 50° from the normal both s (curve (b)) and p-polarized (curve (c)) light showed similar extinctions, and the bands were shifted to shorter wavelengths as expected. The red band-edge for s-polarized light is not shifted to the blue as much as for p-polarized light due to the expected larger bandwidth for s-polarized light, an due to the lower index seen by the p-polarized light in the PEN layers.

EXAMPLE 3 (PEN:PCTG, 449, Polarizer)

A coextruded film containing 481 layers was made by extruding the cast web in one operation and later orienting the film in a laboratory film-stretching apparatus. The feedblock method was used with a 61 layer feedblock and three (2×) multipliers. Thick skin layers were added between the final multiplier and the die. Polyethylene naphthalate (PEN) with an intrinsic viscosity of 0.47 dl/g (60 wt. % phenol/40 wt. % dichlorobenzene) was delivered to the feedblock by one extruder at a rate of 25.0 pounds per hour. Glycol modified polyethylene dimethyl cyclohexane terephthalate (PCTG 5445 from Eastman) was delivered by another extruder at a rate of 25.0 pounds per hour. Another stream of PEN from the above extruder was added as skin layers after the multipliers at a rate of 25.0 pounds per hour. The cast web was 0.007 inches thick and 12 inches wide. The web was layer uniaxially oriented using a laboratory stretching device that uses a pantograph to grip a section of film and stretch it in one direction at a uniform rate while it is allowed to freely relax in the other direction. The sample of web loaded was about 5.40 cm wide (the unconstrained direction) and 7.45 cm long between the grippers of the pantograph. The web was loaded into the stretcher at about 100° C. and heated to 135° C. for 45 seconds. Stretching was then commenced at 20%/second (based on original dimensions) until the sample was stretched to about 6:1 (based on gripper to gripper measurements). Immediately after stretching, the sample was cooled by blowing room temperature air at it. In the center, the sample was found to relax by a factor of 2.0.

Figure 5:
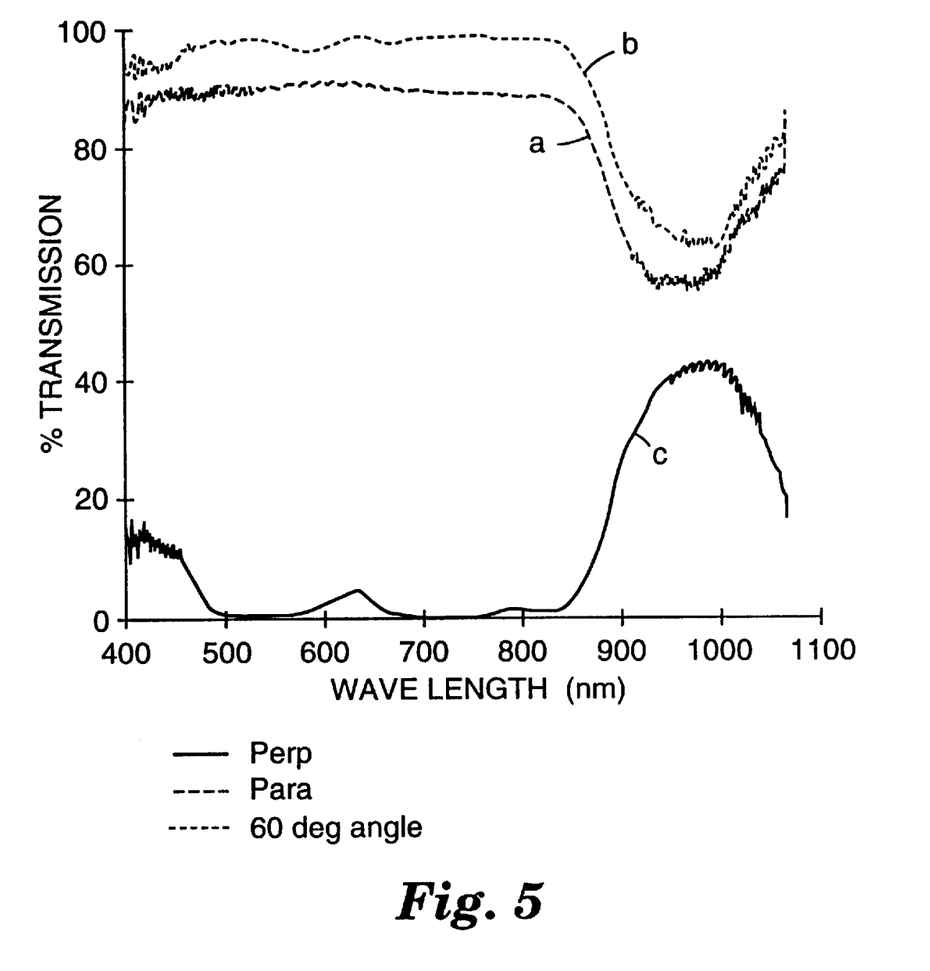

FIG. 5 shows the transmission of this multilayer film where curve a shows transmission of light polarized in the non-stretch direction at normal incidence, curve b shows transmission of p-polarized light polarized in the non-stretched direction at 60° incidence, and curve c shows the transmission of light polarized in the stretch direction at normal incidence. Average transmission for curve a from 400–700 nm is 89.7%, average transmission for curve b from 400–700 nm is 96.9%, and average transmission for curve c from 400–700 nm is 4.0%. % RMS color for curve a is 1.05%, and %RMS color for curve b is 1.44%.

EXAMPLE 4 (PEN:CoPEN, 601 Polarizer)

A coextruded film containing 601 layers was made on a sequential flat-film-making line via a coextrusion process. A Polyethylene naphthalate (PEN) with an intrinsic viscosity of 0.54 dl/g (60 wt % Phenol plus 40 wt % dichlorobenzene) was delivered by on extruder at a rate of 75 pounds per hour and the coPEN was delivered by another extruder at 65 pounds per hour. The coPEN was a copolymer of 70 mole % 2,6 naphthalene dicarboxylate methyl ester, 15% dimethyl isophthalate and 15% dimethyl terephthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. The PEN skin layers were coextruded on the outside of the optical stack with a total thickness of 8% of the coextruded layers. The optical stack was multiplied by two sequential multipliers. The nominal multiplication ratio of the multipliers were 1.2 and 1.27, respectively. The film was subsequently preheated to 310° F. in about 40 seconds and drawn in the transverse direction to a draw ratio of about 5.0 at a rate of 6% per second. The finished film thickness was about 2 mils.

Figure 6:
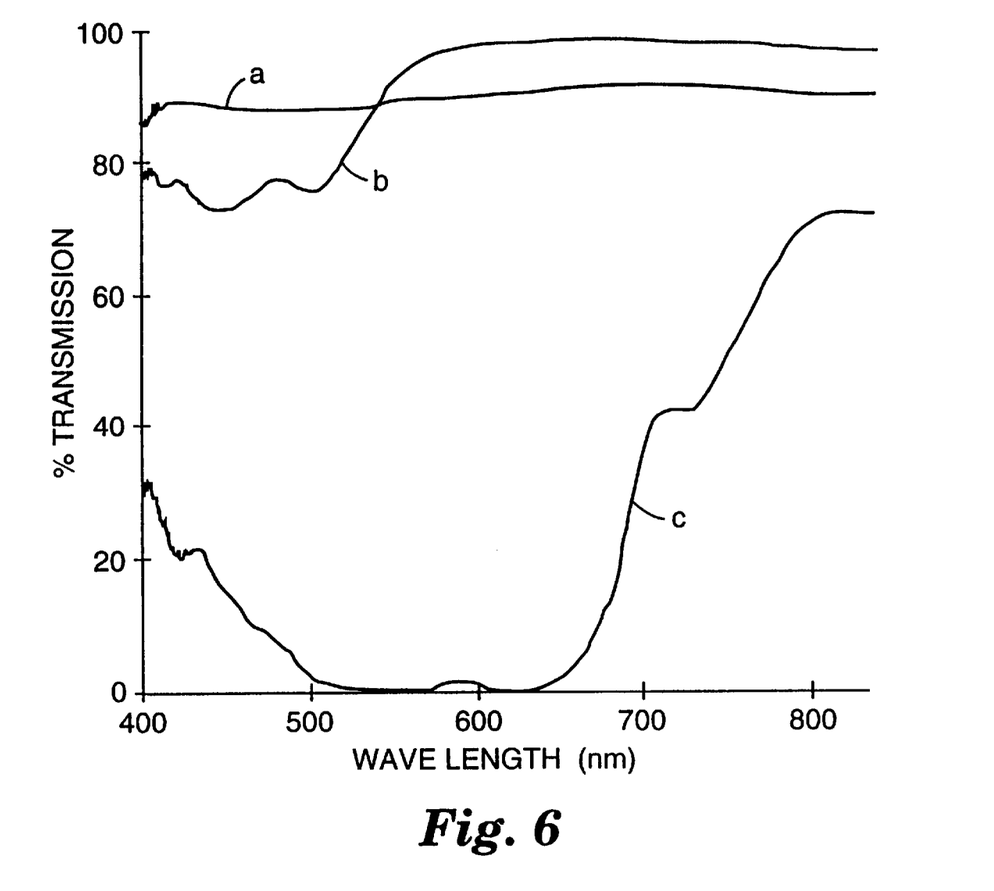

FIG. 6 shows the transmission for this multilayer film. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light in the non-stretch direction at both normal and 60° incidence (80–100%). Also note the very high reflectance of light polarized in the stretched direction in the visible range (400–700 nm) shown by curve c. Reflectance is nearly 99% between 500 and 650 nm.

EXAMPLE 5 (PEN:sPS, 481, Polarizer)

A 481 layer multilayer film was made from a polyethylene naphthalate (PEN) with an intrinsic viscosity of 0.56 dl/g measured in 60 wt. % phenol and 40 wt % dichlorobenzene purchased from Eastman Chemicals and a syndiotactic polystyrene (sPS) homopolymer (weight average molecular weight=200,000 Daltons, sampled from Dow Corporation). The PEN was on the outer layers and was extruded at 26 pounds per hour and the sPS at 23 pounds per hour. The feedblock used produced 61 layers with each of the 61 being approximately tile same thickness. After the feedblock three (2×) multipliers were used. Equal thickness skin layers containing the same PEN fed to the feedblock were added after the final multiplier at a total rate of 22 pounds per hour. The web was extruded through a 12' wide die to a thickness of about 0.011 inches (0.276 mm). The extrusion temperature was 290° C.

This web was stored at ambient conditions for nine days and then uniaxially oriented on a tenter. The film was preheated to about 320° F. (160° C.) in about 25 seconds and drawn in the transverse direction to a draw ratio of about 6:1 at a rate of about 28% per second. No relaxation was allowed in the stretched direction. The finished film thickness was about 0.0018 inches (0.046 mm).

Figure 7:
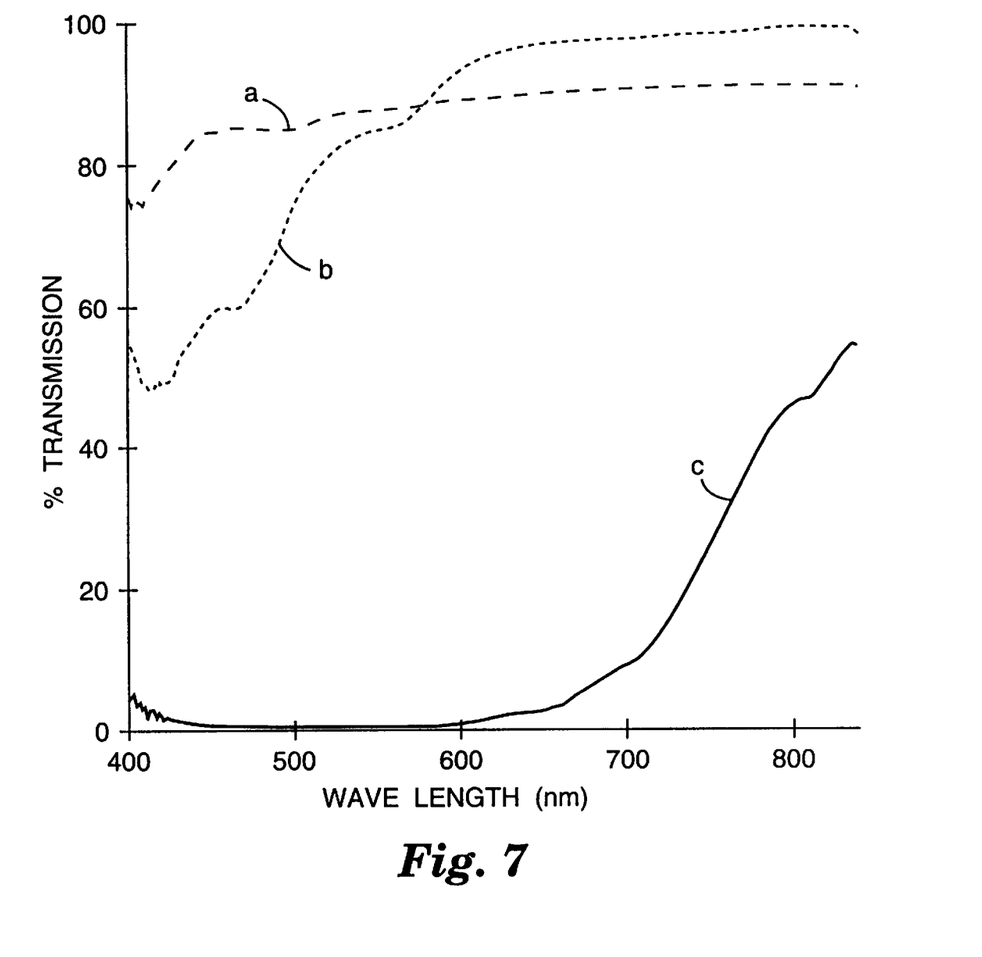

FIG. 7 shows the optical performance of this PEN:sPS reflective polarizer containing 481 layers. Curve a shows transmission of light polarized in the non-stretch direction at normal incidence, curve b shows transmission of p-polarized light at 60° incidence, and curve c shows transmission of light polarized in the stretch direction at normal incidence. Note the very high transmission of p-polarized light at both normal and 60° incidence. Average transmission for curve a over 400–700 nm is 86.2%, the average transmission for curve b over 400–700 nm is 79.7%. Also note the very high reflectance of light polarized in the stretched direction in the visible range (400–700 nm) shown by curve c. The film has an average transmission of 1.6% for curve c between 400 and 700 nm. The % RMS color for curve a is 3.2%, while the % RMS color for curve b is 18.2%.

EXAMPLE 6 (PEN:coPEN, 603,. Polarizer)

A reflecting polarizer comprising 603 layers was made on a sequential flat-film making line via a coextrusion process. A polyethylene naphthalate (PEN) with an intrinsic viscosity of 0.47 dl/g (in 60 wt% phenol plus 40 wt% dichlorobenzene) was delivered by an extruder at a rate of 83 pounds (38 kg) per hour and the CoPEN was delivered by another extruder at 75 pounds (34 kg) per hour. The CoPEN was a copolymer of 70 mole %, 2,6 naphthalene dicarboxylate methyl ester, 15 mole % dimethyl terephthalate, and 15 mole % dimethyl isophthalate with ethylene glycol. The feedblock method was used to generate 151 layers. The feedblock was designed to produce a stack of films having a thickness gradient from top to bottom, with a thickness ratio of 1.22 from the thinnest layers to the thickest layers. This optical stack was multiplied by two sequential multipliers. The nominal multiplication ratio of the multipliers was 1.2 and 1.4, respectively. Between the final multiplier and the die, skin layers were added composed of the same Co/PEN described above, delivered by a third extruder at a total rate of 106 pounds (48 kg) per hour. The film was subsequently preheated to 300° F. (150° C.) in about 30 seconds and drawn in the transverse direction to a draw ratio of approximately 6 at an initial rate of about 20% per second. The finished film thickness was approximately 0.0035 inch (0.089 mm).

Figure 8:
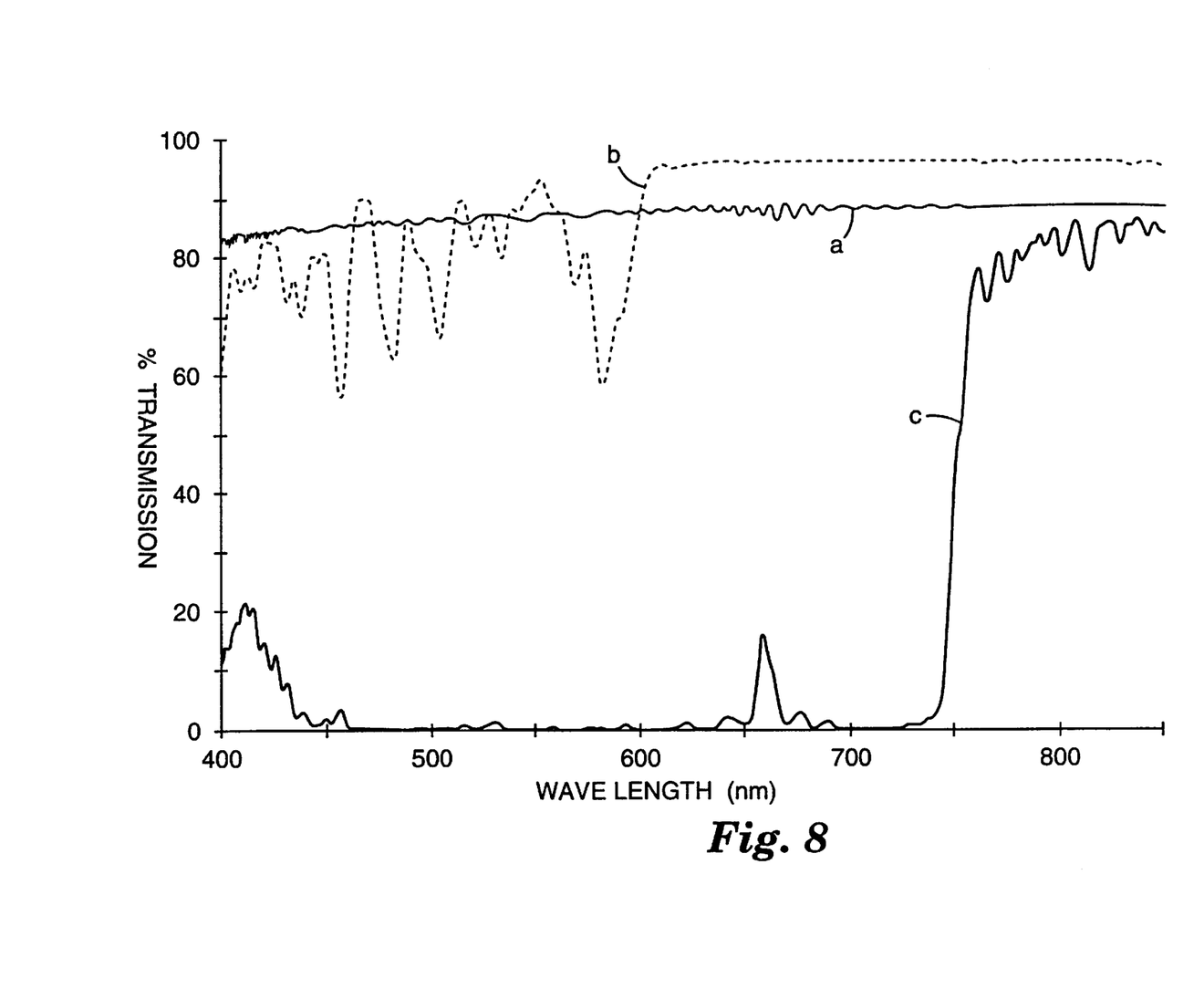

FIG. 8 shows the optical performance of the polarizer of Example 6. Curve a shows transmission of light polarized in the non-stretch direction at normal incidence, curve b shows transmission of p-polarized light in the nonstretch direction at 50 degree angle of incidence, and curve c shows transmission of light polarized in the stretch direction at normal incidence. Note the very high transmission of light polarized in the non-stretch direction. Average transmission for curve a over 400–700 nm is 87%. Also note the very high reflectance of light polarized in the stretched direction in the visible range (400–700 nm) shown by curve c. The film has an average transmission of 2.5% for curve c between 400 and 700 nm. The % RMS color for curve b is 5%.

We claim:

1. A diffuse reflector, comprising:

a reflecting element; and a diffusing adhesive adhered to the surface of the reflecting element, the diffusing adhesive altering the directionality of light as it transmits through the diffusing adhesive while preserving an initial polarization state of the light.

2. A diffuse reflector as recited in claim 1, wherein the reflecting element comprises a reflective polarizer, the reflective polarizer reflecting light of a first polarization state and transmitting light of a second polarization state.

3. A diffuse reflector as recited in claim 2, wherein the reflective polarizer comprises at least two materials where at least one of the two materials is birefringent such that there exists a refractive index difference between the two materials for light of the first polarization state.

4. A diffuse reflector as recited in claim 3, wherein the two materials form multiple layers.

5. A diffuse reflector as recited in claim 1, wherein the diffusing adhesive preserves at least 70% of the initial polarization state.

6. A diffuse reflector as recited in claim 1, wherein the diffusing adhesive preserves at least 85% of the initial polarization state.

7. A diffuse reflector as recited in claim 1, wherein the diffusing adhesive preserves at least 90% of the initial polarization state.

8. A diffuse reflector as recited in claim 1 wherein the diffusing adhesive has a reflectivity of less than 20%.

9. A diffuse reflector as recited in claim 1 wherein the diffusing adhesive has a reflectivity of less than 8%.

10. A diffuse reflector as recited in claim 1 wherein the diffusing adhesive has a reflectivity of less than 4%.

11. A diffuse reflector as recited in claim 1 wherein the diffusing adhesive comprises beads dispersed in a pressure sensitive adhesive.

12. A diffuse reflector as recited in claim 1 wherein the diffusing adhesive comprises styrene beads dispersed in a water-based emulsion adhesive.

13. A diffuse reflector as recited in claim 1, wherein the reflecting element is a mirror.

14. A diffuse reflector as recited in claim 13, wherein the mirror comprises a multilayer stack of at least two materials having different refractive indices.

15. A diffusely reflecting polarizer, comprising:

a reflective polarizer, the reflective polarizer reflecting light of a first polarization state and transmitting light of a second polarization state; and a diffusing adhesive adhered to a surface of the reflective polarizer, the diffusing adhesive being adapted to diffuse light transmitted through the diffusing adhesive while substantially maintaining the polarization of the light.

16. A diffuse reflector, comprising:

a reflecting element having spectral variations in at least one of reflected and transmitted light; and a polarization preserving diffuser disposed to improve the spectral uniformity of the at least one of reflected and transmitted light.

17. A diffuse reflector as recited in claim 16, wherein the polarization preserving diffuser comprises a diffusing adhesive.

18. A diffuse reflector as recited in claim 17, wherein the diffuse reflector is laminated to another component via the diffusing adhesive.

19. A diffuse polarizing reflector system, comprising:

a reflective polarizer that reflects light of a first polarization and transmits light of a second polarization, the reflective polarizer having changes in at least one of spectral reflectivity and transmission; and a polarization preserving diffuser disposed to improve the spectral uniformity of light that is at least one of reflected and transmitted by the reflective polarizer.

20. A diffuse polarizing reflector system as recited in claim 19, wherein the polarization preserving diffuser comprises a diffusing adhesive.

21. A diffuse polarizing reflector system as recited in claim 20, wherein the diffusing adhesive is used to laminate the reflective polarizer to another system component.

22. An liquid crystal display incorporating the diffuse polarizing reflector of claim 19.

* * * * *